United States Patent [19]

Holcomb

[11] Patent Number: 5,197,301
[45] Date of Patent: Mar. 30, 1993

[54] ICE COOLED AIR CONDITIONER AND METHOD

[76] Inventor: Jack N. Holcomb, 1400 NW. 62nd St., Fort Lauderdale, Fla. 33307

[21] Appl. No.: 775,482

[22] Filed: Oct. 15, 1991

[51] Int. Cl.⁵ .............................................. F25D 3/02
[52] U.S. Cl. ................................... 62/457.1; 62/459
[58] Field of Search ................ 62/457.1, 459, 464, 62/529, 312

[56] References Cited

U.S. PATENT DOCUMENTS

| | | | |
|---|---|---|---|
| 640,318 | 1/1900 | Perkins | 62/272 |
| 1,394,924 | 10/1921 | MacFadden | 62/312 |
| 1,627,361 | 5/1927 | Watt | 62/312 |
| 1,903,777 | 4/1933 | Coin | 62/457.1 |
| 2,080,998 | 5/1937 | Brizzolara | 62/459 |
| 2,802,347 | 8/1957 | Marcus | 62/459 |
| 3,961,496 | 6/1976 | Ku | 62/459 |
| 5,062,281 | 11/1991 | Oliphant et al. | 62/457.1 |

Primary Examiner—Albert J. Makay
Assistant Examiner—William C. Doerrler
Attorney, Agent, or Firm—Oltman and Flynn

[57] ABSTRACT

An air conditioning apparatus includes at least one vessel for containing frozen material, at least one duct in thermal communication with the at least one vessel, at least one fan for propelling air through the at least one duct, and at least one battery for powering the at least one fan. The at least one vessel and the at least one duct are preferably in thermal communication with each other through a common wall. Heat fins are preferably provided on the common wall for maximizing the thermal communication. Insulating material preferably covers the at least one vessel and the at least one duct. The at least one duct may have an air entrance port and an air exit port and the at least one fan may include a first electric fan at the air entrance port and a second electric fan at the air exit port. A method of cooling air includes the steps of placing frozen material inside at least one container having an exterior surface, and propelling air into thermal communication with the at least one container over the exterior surface of the at least one container so that heat is transferred from the air into the at least one container.

10 Claims, 2 Drawing Sheets 5,197,301

ICE COOLED AIR CONDITIONER AND METHOD

BACKGROUND OF THE INVENTION

1. Field of the Invention

The present invention relates generally to the field of air conditioners, and more specifically to a vessel containing ice or other frozen material placed in thermal communication with an air duct containing two battery-operated fans, the thermal communication preferably being accomplished through a wall, common to the vessel and the duct, having longitudinal heat fins.

2. Description of the Prior Art

There have long been air conditioners for homes, businesses and automobiles which rely on a complex process of compressing a gas such as freon and then permitting it to expand within a heat exchanger to extract heat from the air. The apparatus forming this type of air conditioner is cumbersome and expensive, and requires a substantial energy input during operation. This sort of apparatus is ill-suited to structures not wired for high voltage electric power supply. Such structures include camping tents, certain maintenance stations within factories, and automobiles not equipped with conventional air conditioning. These devices are also too heavy and bulky to be readily portable.

The best that can be done at present to provide comfort in such structures during hot weather is to bring a battery-operated fan. While the fan-induced circulation of air over the human body evaporates perspiration and thereby cools to some extent, it is only minimally effective where the air temperature is very high.

It is thus an object of the present invention to provide an air conditioning device which is sufficiently compact and light-weight to be carried easily to a location where needed.

It is another object of the present invention to provide such a device which is simple and reliable in construction.

It is still another object of the present invention to provide such a device which can be operated by batteries such as commercially available lantern batteries or automobile batteries.

It is finally an object of the present invention to provide such a device which is inexpensive to purchase and to use.

SUMMARY OF THE INVENTION

The present invention accomplishes the above-stated objectives, as well as others, as may be determined by a fair reading and interpretation of the entire specification.

An air conditioning apparatus is provided which includes at least one vessel for containing frozen material, at least one duct in thermal communication with the at least one vessel, at least one fan for propelling air through the at least one duct, and at least one battery for powering the at least one fan. The at least one vessel and the at least one duct are preferably in thermal communication with each other through a common wall. Heat fins are preferably provided on the common wall for maximizing the thermal communication. The at least one battery may be at least one D size, at least one lantern type or at least one automobile type of battery. Insulating material preferably covers the at least one vessel and the at least one duct. The at least one vessel is preferably essentially cubical and has a bottom face, and the at least one duct extends along the bottom face. A tube in fluid communication with the at least one vessel discharges melted frozen material from the at least one vessel. A tube in fluid communication with the at least one duct discharges condensate from the at least one duct. The at least one duct may have an air entrance port and an air exit port and the at least one fan may include a first electric fan at the air entrance port and a second electric fan at the air exit port.

A method of cooling air is also provided, and includes the steps of placing frozen material inside at least one container having an exterior surface, and propelling air into thermal communication with the at least one container over the exterior surface of the at least one container so that heat is transferred from the air into the at least one container.

BRIEF DESCRIPTION OF THE DRAWINGS

Various other objects, advantages, and features of the invention will become apparent to those skilled in the art from the following discussion taken in conjunction with the following drawings, in which:

4. FIG. 4 is an inverted, close-up view of a section of the common wall between the vessel and the duct, illustrating the heat fins.

5. FIG. 5 is a side view of the device with some of the layer of insulation cut away.

DETAILED DESCRIPTION OF THE PREFERRED EMBODIMENTS

Figure 1:
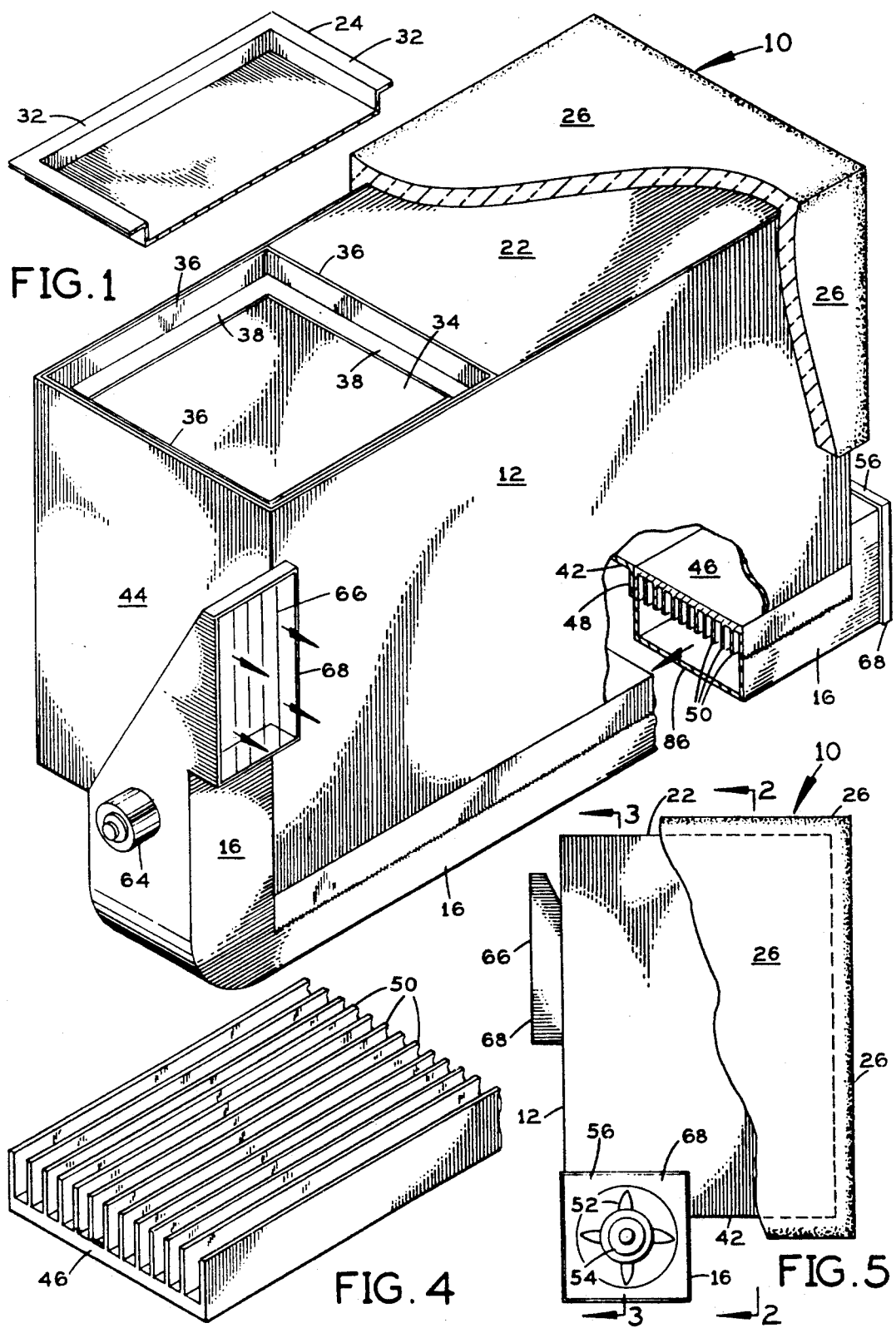
FIG. 1 is a perspective view of the inventive device, showing a large portion of the layer of insulation cut away to reveal the sides of the vessel, and a portion of the front wall of the vessel and the duct also cut away to reveal the heat fins, with arrows indicating the direction of air flow. The lid is shown lifted out of the top of the vessel and cut in cross-section.
Figure 2:
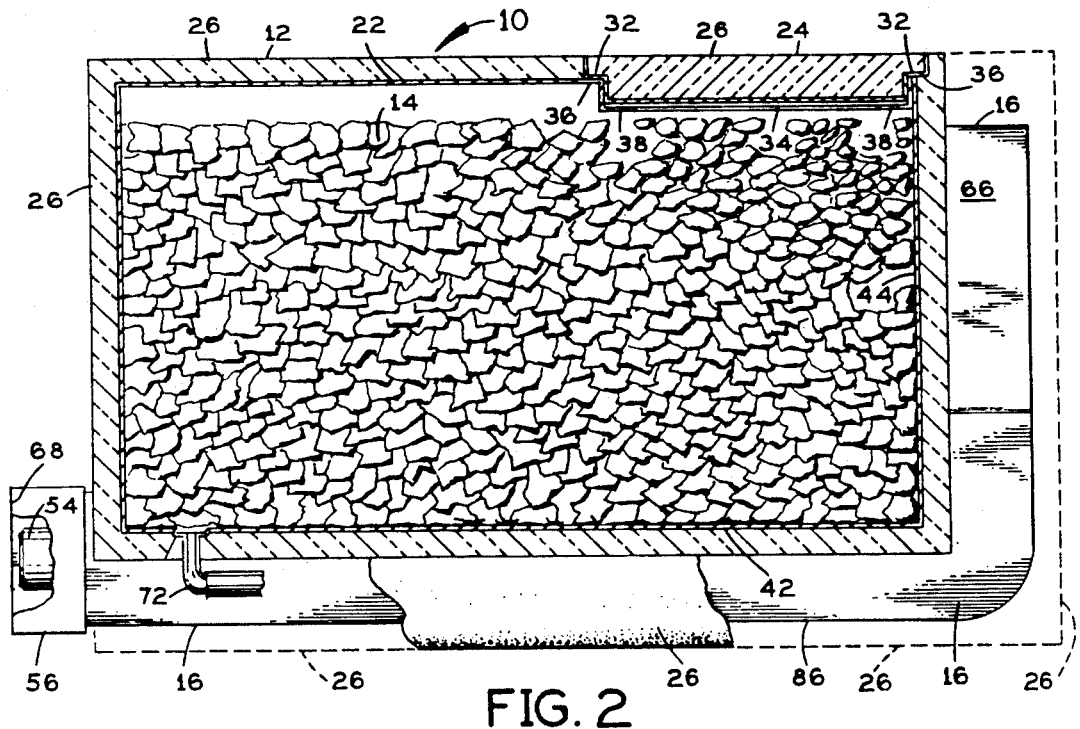
FIG. 2 is a cross-sectional back view revealing the frozen material inside the vessel, part of the first fan motor, the discharge tube for draining melted frozen material from the vessel, and optional insulation around the duct in broken lines. The position of the inserted lid is shown in cross-section.
Figure 3:
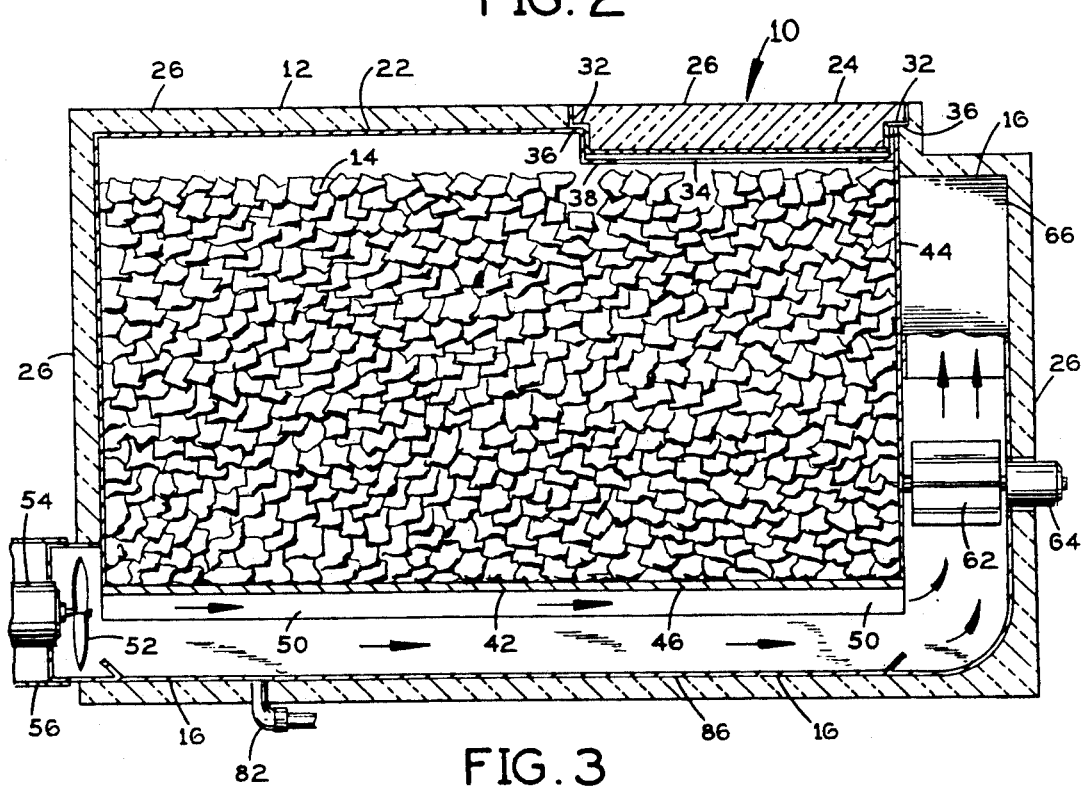
FIG. 3 is a cross-sectional back view, again revealing the frozen material inside the vessel, the complete first and second fans and motors, the interior of the duct, and the discharge tube for draining condensate from the duct. Arrows indicate the direction of air flow.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1 through 5 generally, and FIG. 1 in particular, an air conditioning device 10 is disclosed which includes a vessel 12 for containing frozen material 14 and an air duct 16 in thermal communication with vessel 12. Frozen material 14 is preferably ice, in either crushed or cubed form, as can be purchased at most supermarkets or discharged from most home refrigerators. Substantial energy is expended to freeze material 14 in advance of device 10 use, so that this energy does not have to be supplied at the location during use. Alternatively, any material having high heat capacitance which is chilled in advance might be used.

Vessel 12 is preferably a box in the form of an elongated, hollow cube and is constructed of aluminum for light weight and high thermal conductivity. Vessel 12 is covered by a layer of insulating material 26, such as styrofoam. The upper wall or top 22 of vessel 12 includes a lid 24 which can be opened to insert frozen material 14. Lid 24 takes the shape of a rectangular pan which contains insulating material 26 and has a lip 32 protruding around its perimeter. Lid 24 fits snugly into a rectangular opening 34 in top 22 and lip 32 rests on the edge 36 of opening 34. Edge 36 may be turned downward and then in toward the center of opening 34 to provide a ledge 38 for supporting lid 24. See FIG. 1.

Duct 16 is preferably an aluminum tube having a rectangular cross-section which extends along at least one side of vessel 12. Duct 16 preferably extends along the bottom 42 and then up one side 44 of vessel 12. See FIGS. 2 and 3. A portion of bottom 42 of a width equal to that of top wall 46 of duct 16 is cut away and top wall 46 is fit against vessel 12 to replace this portion. A flap 48 may be turned down from bottom 42 along the side of duct 16 and bonded to duct 16 as by welding. Insulating material 26 also preferably covers duct 16 so that minimal heat is transferred to the air passing through duct 16.

Thermal communication is maximized with the addition of heat fins 50 to duct 16 top wall 46 inside duct 16. See FIG. 4. Heat fins 50 are oriented parallel with the longitudinal axis of duct 16 to permit air to flow between fins 50 with minimal turbulence and resistance.

A conventional propeller fan 52 and motor 54 are placed at the entrance port 56 to duct 16 to draw air into duct 16. See FIG. 5. A second fan 62, preferably of the centrifugal, blower type, and motor 64 are placed at the exit port 66 of duct 16 to draw air through and expel air from duct 16. Motors 54 and 64 are powered by one or more batteries. The batteries may be commercially available D size or lantern type batteries. Where device 10 is used in an automobile, the conventional six or twelve volt automobile battery may supply power. Entrance port 56 and exit port 66 are each preferably covered with a screen or grate 68 to prevent accidental touching of moving fan blades.

Melted frozen material 14 is continually drained from vessel 12 through a first discharge tube 72 in bottom 42 of vessel 12 into a bottle, can or other holding container. Tube 72 is provided with a valve. See FIG. 2. This draining is continuous during device 10 use and prevents melted frozen material 14 in vessel 12 to accumulate and raise vessel 12 temperature. A second discharge tube 82 is provided in the bottom 86 of duct 16 to drain condensate extracted from the air during use. See FIG. 3. Condensate is preferably drained at the conclusion of a given use of device 10. Tube 82 is provided with a valve.

An important purpose is served by propelling air through duct 16 past vessel 12 and into the structure. Were insulating material 26 removed from vessel 12 and heat directly exchanged with the atmosphere instead, the area noticeably cooled would not extend more than a few inches from vessel 12. Duct 16 delivers cooled air with a velocity which disperses the cooled air throughout a wide area around vessel 12. Prototype testing has shown that, where vessel 12 has interior dimensions of 36 inches by 18.5 inches by 13.5 inches, and where frozen material 14 is ice, device 10 can cool for 12 to 14 hours without replacement of frozen material 14.

Method

In practicing the invention, the following method may be used. A frozen material 14 is placed in a vessel 12. Air in thermal communication with vessel 12 is blown past vessel 12 and is cooled by the transfer of heat from the air into vessel 12.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An air conditioning apparatus comprising:
   at least one vessel for containing frozen material having a bottom face and a side face,
   duct means in thermal communication with the at least one vessel through said bottom face and said side face, having a discharge port and extending along said bottom face where frozen material contact is assured and up said side face to permit further thermal communication while positioning said discharge port at a convenient elevation,
   fan means for propelling air through said duct means,
   at least one battery for powering said fan means.

2. An apparatus as in claim 1, additionally comprising heat fins on the common wall for maximizing thermal communication between the at least one vessel and the duct means.

3. An apparatus as in claim 1, wherein the at least one battery is at least one D size battery.

4. An apparatus as in claim 1, wherein the at least one battery is at least one automobile battery.

5. An apparatus as in claim 1, additionally comprising insulating material covering the at least one vessel and the duct means.

6. An apparatus as in claim 1, wherein the at least one vessel is essentially cubical.

7. An apparatus as in claim 1, additionally comprising tube means in fluid communication with the at least one vessel for discharging melted frozen material from the at least one vessel.

8. An apparatus as in claim 1, additionally comprising tube means in fluid communication with the duct means for discharging condensate from the duct means.

9. An apparatus as in claim 1, wherein the duct means has an air entrance port and an air exit port and the fan means comprises a first electric fan at the air entrance port and a second electric fan at the air exit port.

10. A method of cooling air comprising the steps of:
    placing frozen material inside container means having a bottom face and a side face, duct means in thermal communication with the container means through said bottom face and said side face, having a discharge port and extending along said bottom face where frozen material contact is assured and up said side face to permit further thermal communication while positioning the discharge port at a convenient elevation,
    propelling air into thermal communication with the container means through said duct means so that heat is transferred from the air into the container means.

* * * * *